United States Patent
Sen Gupta et al.

(10) Patent No.: US 11,099,002 B2
(45) Date of Patent: Aug. 24, 2021

(54) SYSTEMS AND METHODS OF ASSESSING A COATING MICROSTRUCTURE

(71) Applicant: General Electric Company, Schenectady, NY (US)

(72) Inventors: Esha Sen Gupta, Karnataka (IN); Shyamsunder Tondanur Mandayam, Karantaka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/707,493

(22) Filed: Dec. 9, 2019

(65) Prior Publication Data

US 2021/0172726 A1 Jun. 10, 2021

(51) Int. Cl.
*G01B 11/06* (2006.01)
*G01N 21/84* (2006.01)
(Continued)

(52) U.S. Cl.
CPC ......... *G01B 11/0625* (2013.01); *G01N 21/01* (2013.01); *G01N 21/55* (2013.01);
(Continued)

(58) Field of Classification Search
None
See application file for complete search history.

(56) References Cited

U.S. PATENT DOCUMENTS 3,994,586 A * 11/1976 Sharkins .............. G01B 11/065
356/73
9,017,792 B2 4/2015 Liu et al.
(Continued)

FOREIGN PATENT DOCUMENTS

CN 108519059 A 9/2018
CN 208998745 U 6/2019
JP 6281941 B2 2/2018

OTHER PUBLICATIONS

Roth, Donald J. et al., "Absolute Thickness Measurements on Coatings Without Prior Knowledge of Material Properties Using Terahertz Energy," NASA/TM—2013-216603, Dec. 2013; available at https://ntrs.nasa.gov/search.jsp?R=20140010691 2019-08-26121:26:02+00:00Z; last visited Aug. 26, 2019; 28 pp.
(Continued)

*Primary Examiner* — Michelle M Iacoletti

(74) *Attorney, Agent, or Firm* — Dority & Manning, P.A.

(57) ABSTRACT

A system for inspecting a coating on a substrate, the system including a platform that receives a sample including the substrate having the coating, and a light source that directs a plurality of electromagnetic pulses towards a scanning location on the coating, wherein the light source is oriented to direct the plurality of electromagnetic pulses at an oblique angle relative to a surface of the coating. A light detector receives electromagnetic pulses reflected from the sample, wherein a first portion of each electromagnetic pulse is reflected from the surface of the coating, and a second portion of each electromagnetic pulse is reflected from a surface of the substrate. An actuator is coupled to the platform and/or the light source, wherein the actuator moves the platform and the light source relative to each other such that the plurality of electromagnetic pulses are directable towards the scanning location from different rotational positions.

18 Claims, 7 Drawing Sheets

(51) Int. Cl.
  *G01N 21/55* (2014.01)
  *G01N 21/01* (2006.01)
(52) U.S. Cl.
  CPC . *G01N 21/8422* (2013.01); *G01N 2021/0106* (2013.01); *G01N 2021/557* (2013.01); *G01N 2021/8427* (2013.01)

(56) References Cited

U.S. PATENT DOCUMENTS

| | | | |
|---|---|---|---|
| 10,254,219 B1 * | 4/2019 | Adams | G01J 3/42 |
| 2014/0118751 A1 * | 5/2014 | Rajagopalan | H01L 21/67253 356/630 |
| 2014/0264032 A1 | 9/2014 | Neshat et al. | |
| 2018/0120246 A1 | 5/2018 | Baucke et al. | |
| 2018/0238814 A1 * | 8/2018 | Sapiens | G01J 3/36 |
| 2018/0364037 A1 | 12/2018 | Singh et al. | |

OTHER PUBLICATIONS

Fukuchi, Tetsuo et al., "Topcoat Thickness Measurement of Thermal Barrier Coating of Gas Turbine Blade Using Terahertz Wave," Electrical Engineering in Japan; vol. No. 189, Issue No. 1, 2014; 8 pp.

Ellrich et al, "Terahertz Quality Inspection for Automotive and Avaition Industries", Journal of Infrared Millimeter and Terahertz Waves, Springer New York LLC, vol. 41 No. 4, Nov. 26, 2019) pp. 470-489.

Qui et al, "Fast terahertz reflective confocal scanning imaging with a quantum cascade laser and a photodetector" Applied Physics B: Lasers and Optics, Springer International, Berlin, DE. vol. 125 No. 5, May 2, 2019, pp. 1-8.

\* cited by examiner

| Sample # | Δt (0 deg) | Δt (45 deg) | Δt (90 deg) | Standard Dev. (Δt) |
|---|---|---|---|---|
| 1 | 1.1 | 1.1 | 1.1 | 0 |
| 2 | 1.17 | 1.17 | 1.17 | 0 |
| 3 | 3.5 | 3.5 | 4 | 0.29 |
| 4 | 3.2 | 3.8 | 3.8 | 0.35 |
| 5 | 5.5 | 4.8 | 4.8 | 0.40 |
| 6 | 4.8 | 4.8 | 5.6 | 0.46 |
| 7 | 6.2 | 6.2 | 6.3 | 0.06 |
| 8 | 6.7 | 6.8 | 6.9 | 0.10 |

SYSTEMS AND METHODS OF ASSESSING A COATING MICROSTRUCTURE

BACKGROUND

The field of the disclosure relates generally to systems and methods of non-destructive examination and, more specifically, to non-destructive examination of single or multi-layer coating structures deposited on substrates.

Some components, such as hot gas path components of gas turbines, are subjected to high temperatures while in service. At least some such components include a coating system, including a thermal barrier coating and bond coat, on an exterior surface exposed to the high temperatures. The microstructure of many known thermal barrier coatings is dependent on the process parameters of the coating application process. For example, thermal barrier coatings made of the same material may nevertheless have varying microstructures due to variations in the process parameters of the respective coating application processes. Some microstructures are effective at protecting components from exposure to high temperatures, while other microstructures may have a comparatively reduced effectiveness and shorter service life. However, at least some known methods for determining the microstructure of a particular coating are time-consuming and expensive to implement.

BRIEF DESCRIPTION

In one aspect, a system for use in inspecting a coating on a substrate is provided. The system includes a platform configured to receive a sample including the substrate having the coating deposited thereon, and a light source configured to direct a plurality of electromagnetic pulses towards a scanning location on the coating, wherein the light source is oriented to direct the plurality of electromagnetic pulses at an oblique angle relative to a surface of the coating. A light detector is configured to receive electromagnetic pulses reflected from the sample, wherein a first portion of each electromagnetic pulse is reflected from the surface of the coating, and a second portion of each electromagnetic pulse is reflected from a surface of the substrate. An actuator is coupled to at least one of the platform and the light source, wherein the actuator is configured to move the platform and the light source relative to each other such that the plurality of electromagnetic pulses are directable towards the scanning location from different rotational positions.

In another aspect, a method of inspecting a coating on a substrate is provided. The method includes directing a plurality of electromagnetic pulses towards a scanning location on the coating, each electromagnetic pulse directed from a different rotational position relative to the scanning location, and each electromagnetic pulse directed at an oblique angle relative to a surface of the coating. A first portion of each electromagnetic pulse is reflected from the surface of the coating, and a second portion of each electromagnetic pulse is reflected from a surface of the substrate at an interface between the coating and the substrate. The method also includes assessing a time delay between reception of the first portion and the second portion of each reflected electromagnetic pulse at a light detector, thereby defining a plurality of time delays, and analyzing the time delays to assess a microstructure of the coating.

In yet another aspect, a method of assessing a coating microstructure is provided. The method includes providing a plurality of samples each having a substrate and a coating deposited thereon, evaluating each sample with a plurality of electromagnetic pulses that are each directed from a different rotational position relative to the respective sample, and obtaining time delay data associated with the plurality of electromagnetic pulses being reflected from the plurality of samples. Time delay is defined by receiving a first portion and a second portion of each electromagnetic pulse reflected from each sample at different points in time. The method also includes assessing a microstructure of the coating on the plurality of samples based on a comparison of the time delay data associated with the plurality of samples.

DRAWINGS

These and other features, aspects, and advantages of the present disclosure will become better understood when the following detailed description is read with reference to the accompanying drawings in which like characters represent like parts throughout the drawings, wherein.

Figure 1:
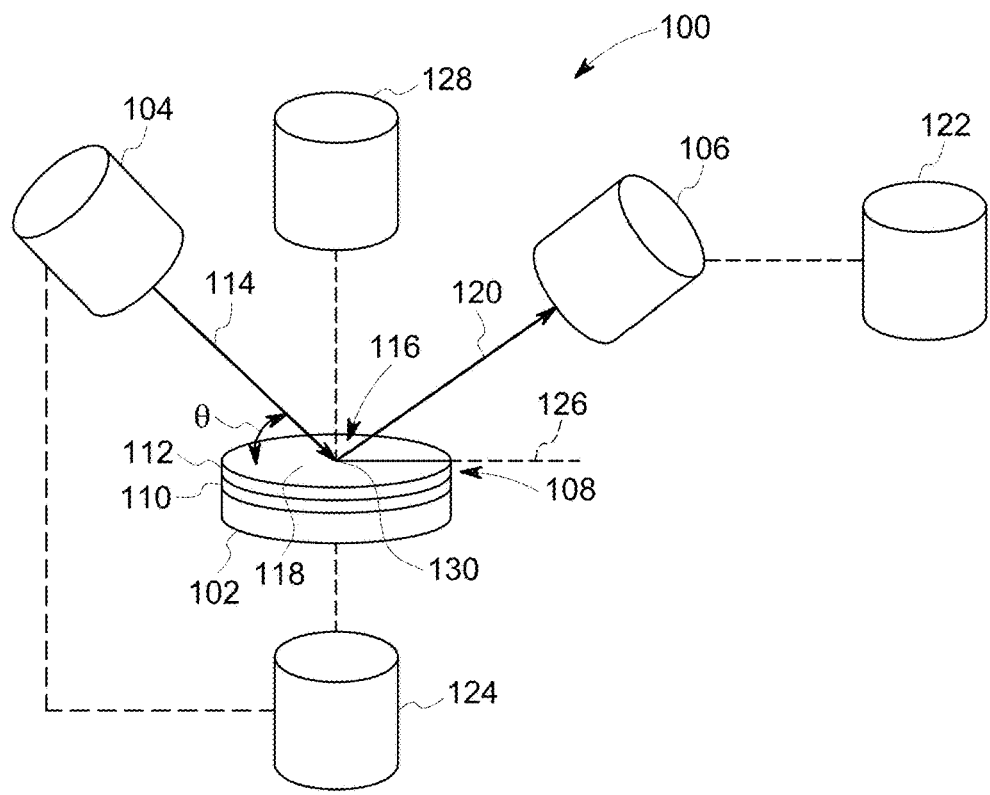
FIG. 1 is a schematic illustration of an exemplary inspection system for use in assessing a coating microstructure, the inspection system in a first mode of operation.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to non-destructive examination of single or multi-layer coating structures deposited on substrates. In the exemplary embodiment, the inspection system described herein includes a platform that receives a sample thereon, a light source for directing electromagnetic pulses towards the sample, and a light detector for receiving electromagnetic pulses reflected from the sample. The electromagnetic pulses directed towards the sample have a wavelength in the terahertz frequency range. At this frequency range, the electromagnetic pulses are partially reflected from the air/coating interface at a surface of the coating on the sample, and the rest of the wave travels through the coating and is reflected from the coating/substrate interface. A time delay realized as a result of the difference in travel length of the reflected electromagnetic pulses facilitates estimating a thickness of the coating as well as its refractive index.

In birefringent materials, the refractive index is dependent on the direction of propagation of an incident beam. Birefringent materials are anisotropic in nature (i.e., they have a defined crystal structure periodicity). In the inspection system described herein, the platform and the light source are moved or rotated relative to each other to enable time delay data to be obtained with the light source positioned at different rotational positions relative to a scanning location on the coating. In many known thermal barrier coatings, two different types of microstructures are typically observed. One is a columnar type, which is more ordered and anisotropic in nature. The other is a cauliflower type, which is more random in structure (i.e., isotropic). It is expected that the time delay will vary in anisotropic materials, and that the time delay will be largely consistent in isotropic materials, as the sample is inspected from the different rotational positions. Using the time delay data obtained from the inspection process, the amount of birefringence contained within a particular sample is determinable, thereby enabling the type of microstructure to be identified in a fast, efficient, and non-destructive manner.

FIG. 1 is a schematic illustration of an exemplary inspection system 100 in a first mode of operation. In the exemplary embodiment, inspection system 100 includes a platform 102, a light source 104, and a light detector 106. Platform 102 receives a sample 108 to be inspected thereon. Sample 108 includes a substrate 110 having a coating 112 deposited thereon. Substrate 110 and coating 112 may be fabricated of any material that enables inspection system 100 to function as described herein. Example substrate materials include, but are not limited to, metallic materials that are nickel-based, cobalt-based, and the like. An example coating material includes, but is not limited to, a ceramic material.

In operation, light source 104 directs electromagnetic pulses 114 towards a scanning location 116 on coating 112. Light source 104 is oriented to direct the plurality of electromagnetic pulses at an oblique angle θ relative to a surface 118 of coating 112. Accordingly, light source 104 is oriented to accurately obtain time delay data from potentially birefringent material having anisotropic microstructures, as described above. The plurality of electromagnetic pulses 114 have a wavelength in the terahertz (THz) frequency range defined within a range between about 0.1 THz and about 4 THz. In an alternative embodiment, electromagnetic pulses 114 have a wavelength in any frequency range that enables inspection system 100 to function as described herein.

Light detector 106 receives electromagnetic pulses 120 reflected from sample 108. As will be described in more detail below, a first portion of each electromagnetic pulse 120 is reflected from surface 118 of coating 112, and a second portion of each electromagnetic pulse 120 is reflected from a surface of substrate 110. Inspection system 100 also includes a computing device 122 in communication with light detector 106. Computing device 122 determines a time delay between reception of the first portion and the second portion of each reflected electromagnetic pulse 120 at light detector 106. Computing device 122 may then analyze time delay, for electromagnetic pulses 114 directed towards sample 108 from different rotational positions, to determine a microstructure of coating 112.

For example, at least one of platform 102 and light source 104 is coupled to an actuator 124. Actuator 124 moves platform 102 and/or light source 104 such that the plurality of electromagnetic pulses 114 are directable towards scanning location 116 from the different rotational positions. More specifically, actuator 124 may be coupled to platform 102 for rotating platform 102 relative to light source 104. Alternatively, or additionally, actuator 124 may be coupled to light source 104 for moving light source 104 about platform 102.

Figure 2:
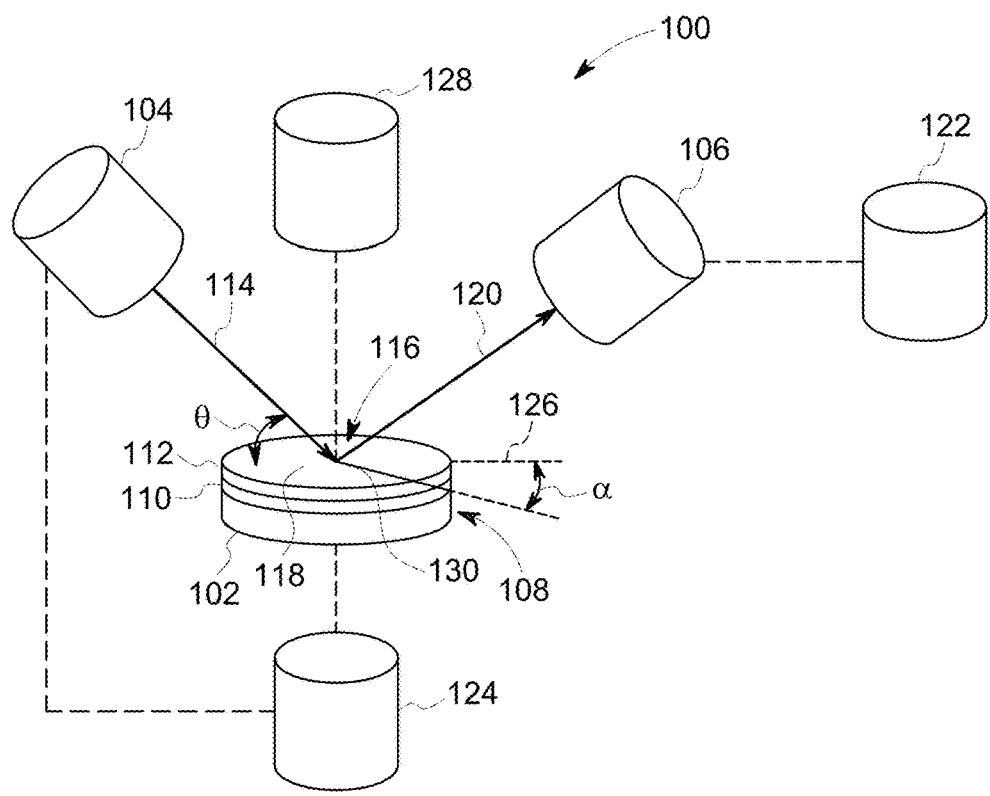
FIG. 2 is a schematic illustration of the inspection system shown in FIG. 1 after the sample has been rotated by a first angle.
Figure 3:
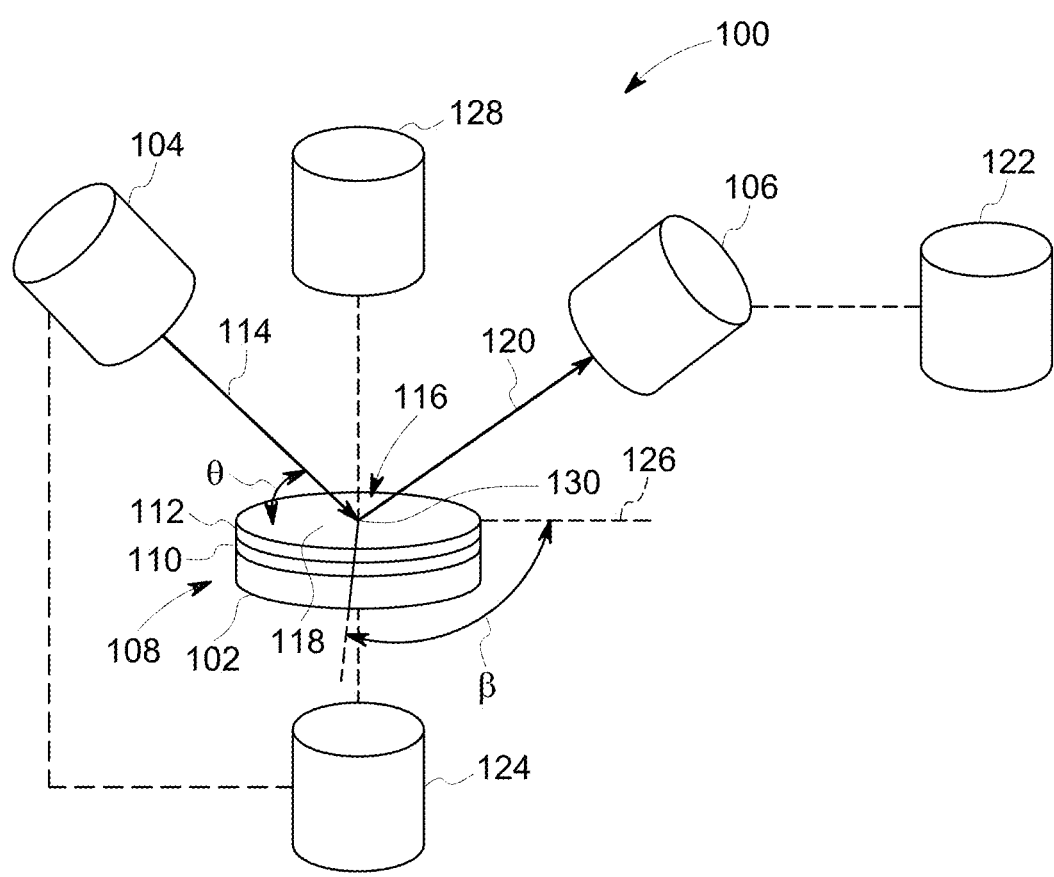
FIG. 3 is a schematic illustration of the inspection system shown in FIG. 1 after the sample has been rotated by a second angle.

As shown in FIG. 1, actuator 124 orients sample 108 at a first rotational angle (i.e., 0 degrees) relative to a reference axis 126. In operation, first time delay data is obtained when sample 108 is oriented at the first rotational angle, and actuator 124 then orients sample 108 at a second rotational angle α (e.g., 45 degrees) relative to reference axis 126, as shown in FIG. 2. Second time delay data is obtained when sample 108 is oriented at second rotational angle α, and actuator 124 then orients sample 108 at a third rotational angle θ (e.g., 90 degrees) relative to reference axis 126, as shown in FIG. 3. Third time delay data is obtained when sample 108 is oriented at third rotational angle (3, and the birefringence of coating 112 may be determined based on an analysis of the time delay data by computing device 122.

Inspection system 100 also includes a scanning positioner 128 for providing visual positioning guidance on sample 108, which facilitates ensuring the same scanning location 116 is evaluated by electromagnetic pulses 114 being directed towards sample 108 from the different rotational positions. Scanning positioner 128 may be any positioning device that enables inspection system 100 to function as described herein. In the exemplary embodiment, scanning positioner 128 is a laser projection device that provides a visual cue 130 on surface 118 of coating 112 at scanning location 116. Accordingly, electromagnetic pulses 114 are directable towards the same location on coating 112 regardless of the relative rotational position of light source 104 to sample 108.

Figure 4:
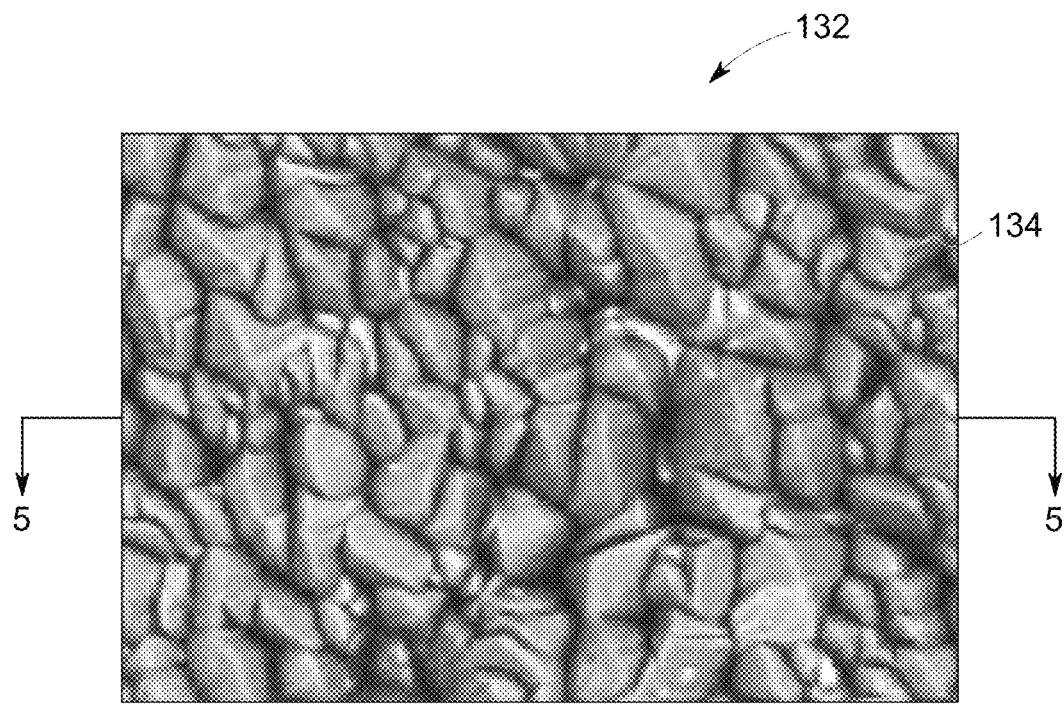
FIG. 4 illustrates a top view of an exemplary first sample that may be inspected with the system shown in FIGS. 1-3, the first sample having a first microstructure.
Figure 5:
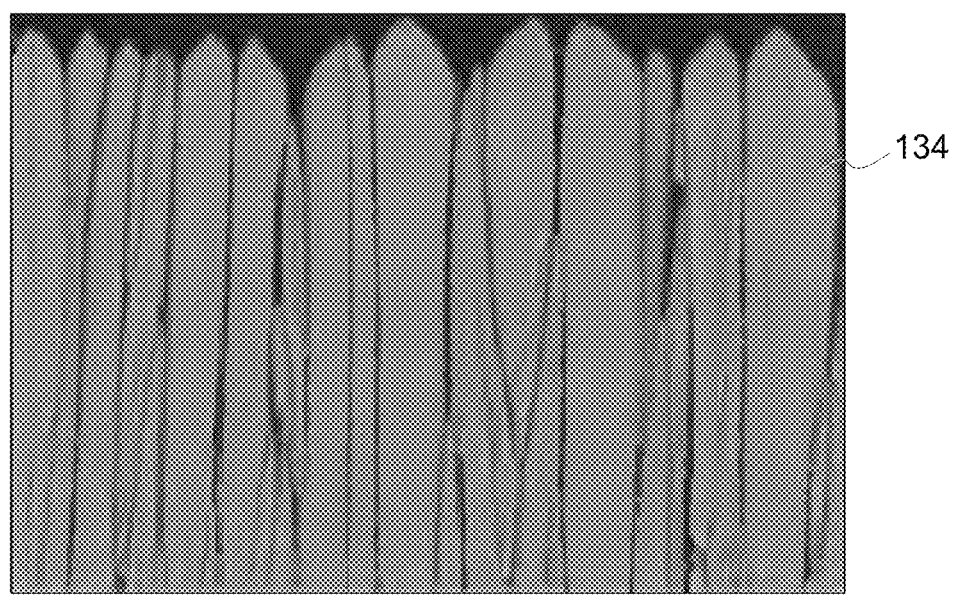
FIG. 5 illustrates a cross-sectional view of the first sample shown in FIG. 4, the view taken along Line 5-5.

FIGS. 4 and 5 illustrate top and cross-sectional views of an exemplary first sample 132 that may be inspected with inspection system 100 (shown in FIGS. 1-3). In the exemplary embodiment, first sample 132 includes a coating 134 having a first microstructure type that is columnar, ordered, and thus inherently anisotropic in nature.

Figure 6:
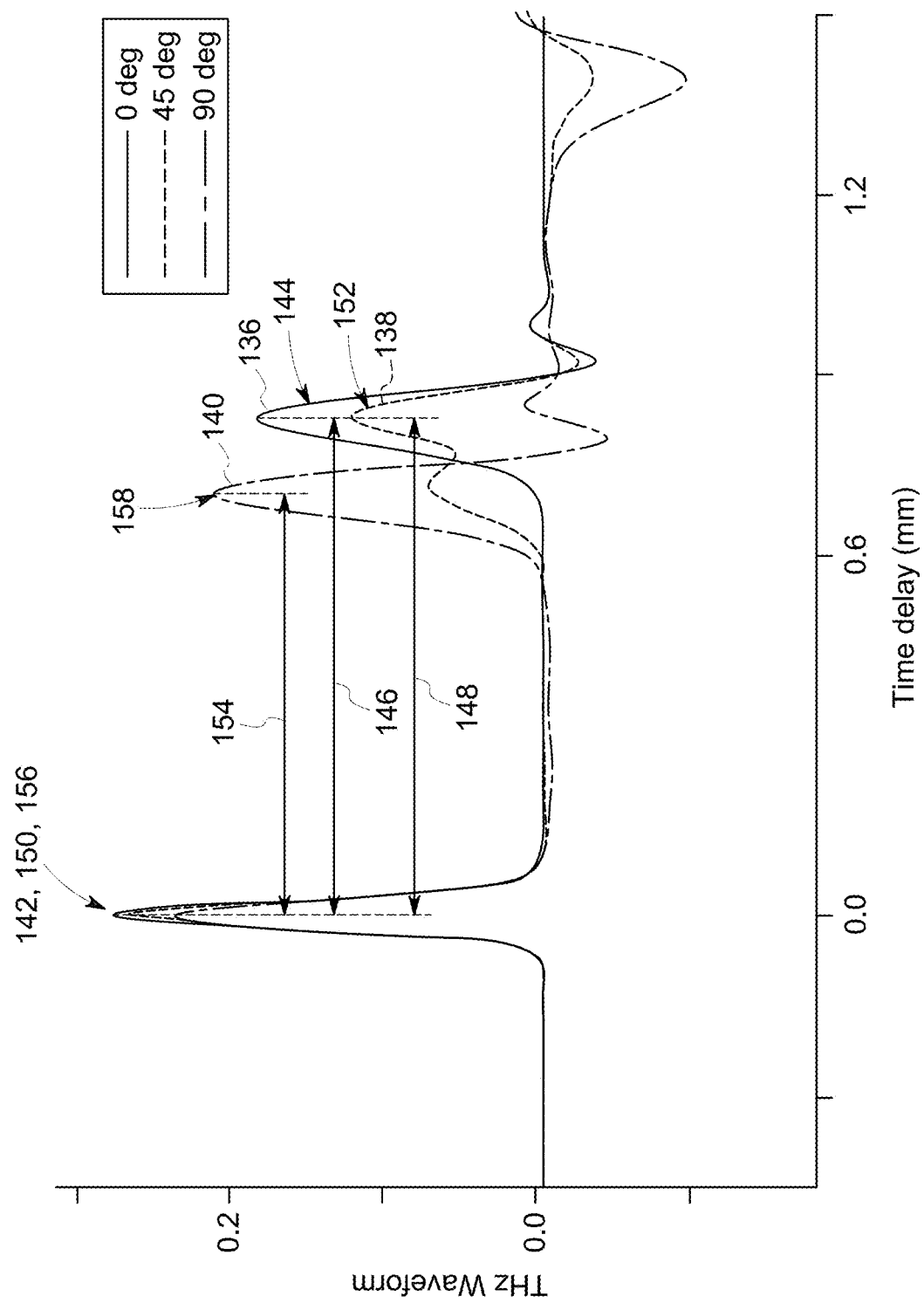
FIG. 6 illustrates test results obtained from inspection of the first sample shown in FIG. 4.

FIG. 6 illustrates test results obtained from inspection of first sample 132 (shown in FIGS. 4 and 5). In the exemplary embodiment, first sample 132 is inspected by directing a first electromagnetic pulse 136, a second electromagnetic pulse 138, and a third electromagnetic pulse 140 towards coating 134 (shown in FIGS. 4 and 5). First electromagnetic pulse 136 is directed when first sample 132 is oriented at the first rotational angle, as shown in FIG. 1. First electromagnetic pulse 136 reflected from first sample 132 includes a first portion 142 received at a first point in time and a second portion 144 received at a second point in time. The difference in time that first portion 142 and second portion 144 are received defines a first time delay 146. In addition, second electromagnetic pulse 138 is directed when first sample 132 is oriented at second rotational angle α, as shown in FIG. 2, and third electromagnetic pulse 140 is directed when first sample 132 is oriented at third rotational angle β, as shown in FIG. 3. A second time delay 148 is defined by a first portion 150 and a second portion 152 of reflected second electromagnetic pulse 138 received at different points in time, and a third time delay 154 is defined by a first portion 156 and a second portion 158 of reflected third electromagnetic pulse 140 received at different points in time.

Figure 7:
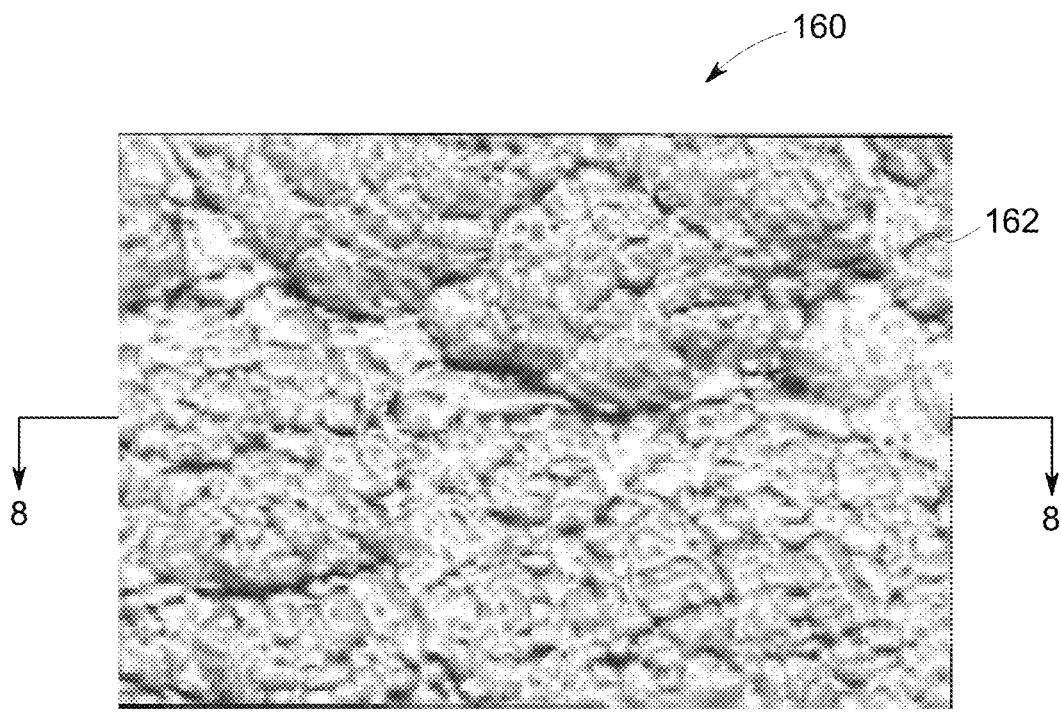
FIG. 7 illustrates a top view of an exemplary second sample that may be inspected with the system shown in FIGS. 1-3, the second sample having a second microstructure.
Figure 8:
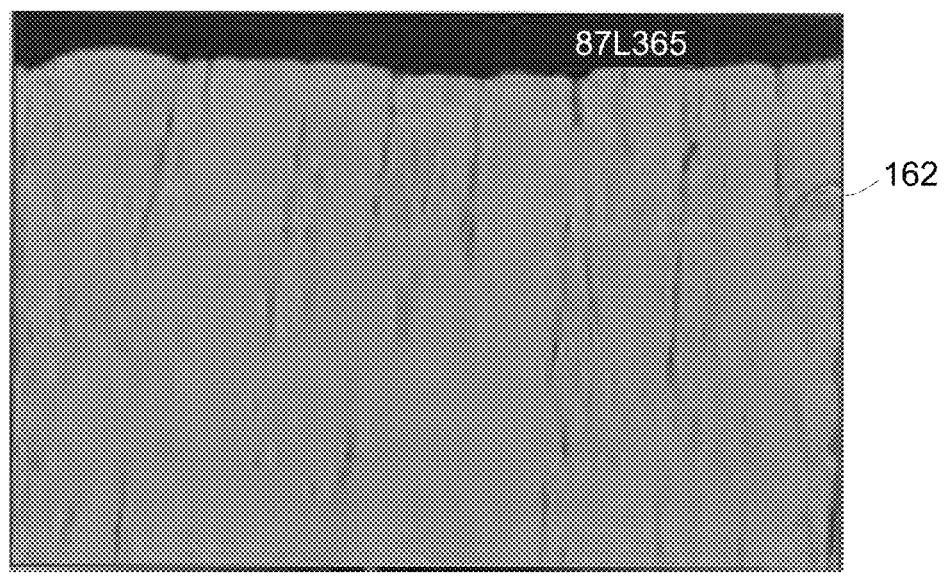
FIG. 8 illustrates a cross-sectional view of the second sample shown in FIG. 7, the view taken along Line 8-8.

FIGS. 7 and 8 illustrate top and cross-sectional views of an exemplary second sample 160 that may be inspected with inspection system 100 (shown in FIGS. 1-3). In the exemplary embodiment, second sample 160 includes a coating 162 having a second microstructure type that is more random in structure when compared to the first microstructure type shown in FIGS. 4 and 5, and is thus more isotropic in nature than the first microstructure type.

Figure 9:
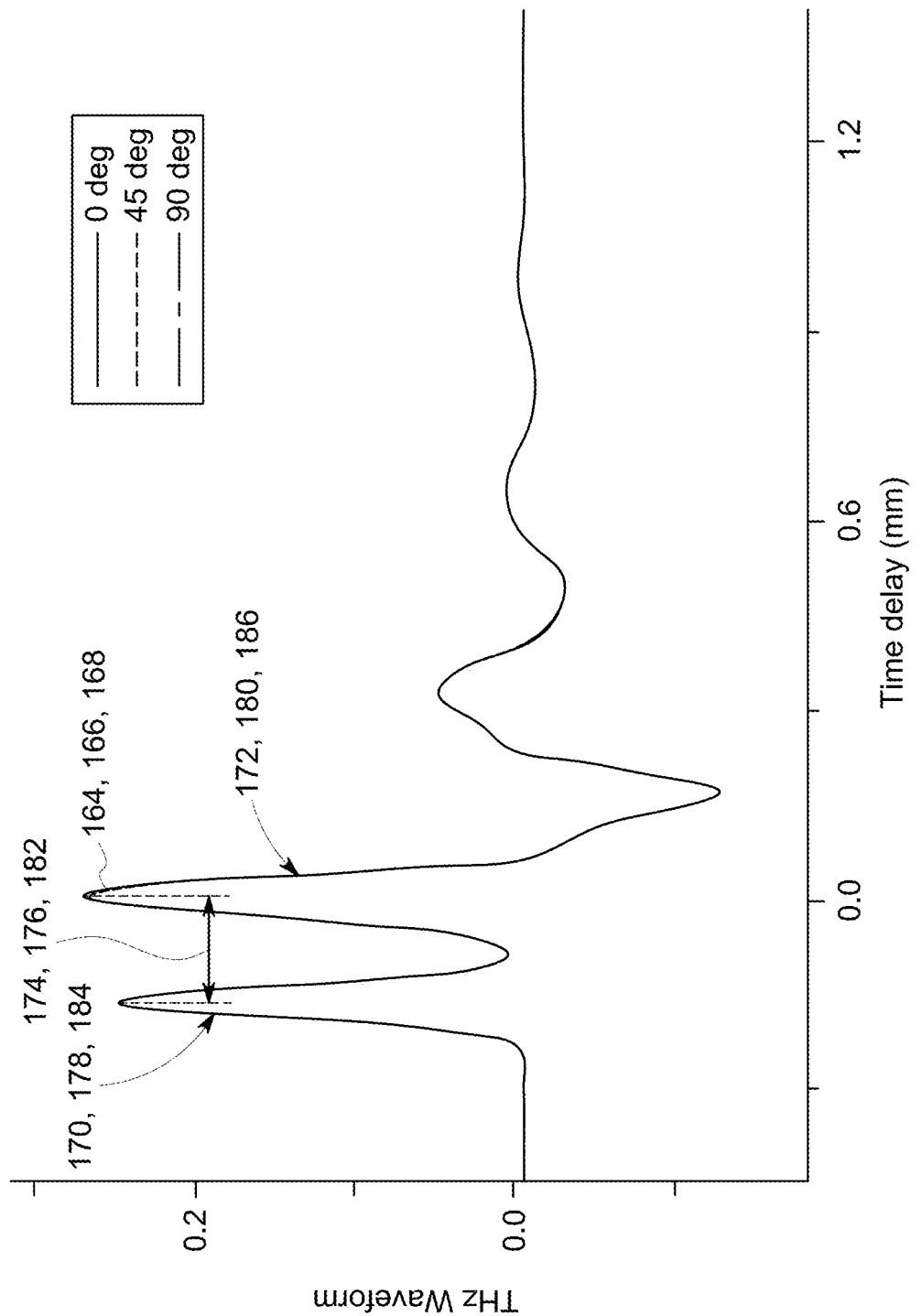
FIG. 9 illustrates test results obtained from inspection of the second sample shown in FIG. 7.

FIG. 9 illustrates test results obtained from inspection of second sample 160 (shown in FIGS. 7 and 8). In the exemplary embodiment, second sample 160 is inspected by directing a fourth electromagnetic pulse 164, a fifth electromagnetic pulse 166, and a sixth electromagnetic pulse 168 towards coating 162 (shown in FIGS. 7 and 8). Fourth electromagnetic pulse 164 is directed when second sample 160 is oriented at the first rotational angle, as shown in FIG. 1. Fourth electromagnetic pulse 164 reflected from second sample 160 includes a first portion 170 received at a first point in time and a second portion 172 received at a second point in time. The difference in time that first portion 170 and second portion 172 are received defines a fourth time delay 174. In addition, fifth electromagnetic pulse 166 is directed when second sample 160 is oriented at second rotational angle α, as shown in FIG. 2, and sixth electromagnetic pulse 168 is directed when second sample 160 is oriented at third rotational angle β, as shown in FIG. 3. A fifth time delay 176 is defined by a first portion 178 and a second portion 180 of reflected fifth electromagnetic pulse 166 received at different points in time, and a sixth time delay 182 is defined by a first portion 184 and a second portion 186 of reflected sixth electromagnetic pulse 168 received at different points in time.

As shown in FIG. 6, the anisotropic nature of coating 134 (shown in FIGS. 4 and 5) causes first time delay 146, second time delay 148, and third time delay 154 to each have different values. In addition, as shown in FIG. 9, the isotropic nature of coating 162 causes fourth time delay 174, fifth time delay 176, and sixth time delay 182 to be substantially equal. Time delays 146, 148, 154, 174, 176, and 182 may be analyzed to assess the microstructures of coatings 134 and 162. For example, computing device 122 (shown in FIGS. 1-3) may receive the values of time delays 146, 148, and 154, and of time delays 174, 176, and 182. Computing device 122 may then determine a standard deviation of the time delay values associated with each sample. In one embodiment, the microstructure of coatings 134 and 162 is determined by comparing the standard deviation associated with each sample to a predetermined threshold. A first microstructure is determined to be present when the standard deviation is greater than the predetermined threshold, and a second microstructure is determined to be present when the standard deviation is less than the predetermined threshold.

Figure 10:
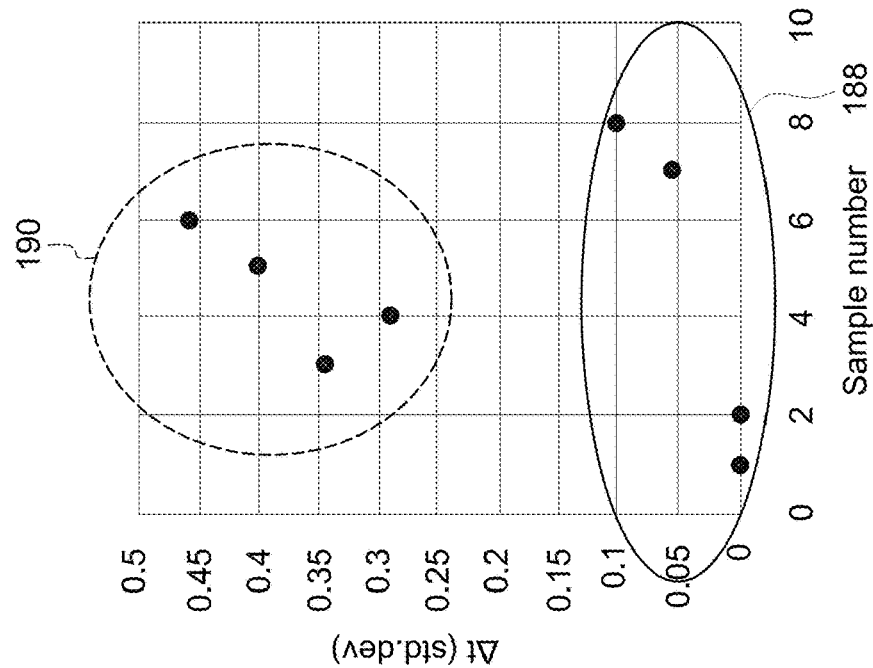
FIG. 10 illustrates test results obtained from inspection of a plurality of samples using the system shown in FIGS. 1-3.

FIG. 10 illustrates test results obtained from inspection of a plurality of samples 108 using inspection system 100 (shown in FIGS. 1-3). As shown in FIG. 10, eight samples 108 were fabricated and evaluated, but it should be understood that any number of samples 108 may be fabricated and evaluated that enables the method of assessing a coating microstructure to function as described herein. In the exemplary embodiment, each sample 108 was evaluated using the inspection system 100 as described above, and the microstructure of coating 112 on each sample 108 is determinable based on a comparison of the time delay data associated with each sample 108. For example, a standard deviation of the time delay data associated with each sample 108 is determined for each sample 108. The standard deviation values are then compared to each other and grouped based on relative differences in the standard deviation values.

In the exemplary embodiment, the standard deviation values of samples 3, 4, 5, and 6 are greater than the standard deviation values of samples 1, 2, 7, and 8. A first cluster 188 and a second cluster 190 may be defined based on relative differences in the standard deviation values. For example, the difference between the highest and lowest standard deviation values contained in either first cluster 188 or second cluster 190 may be a first value, and the difference between the highest standard deviation value in first cluster 188 and the lowest standard deviation value in second cluster may be a second value. First cluster 188 and second cluster 190 are defined based on the first value being less than the second value. As such, the microstructure of coating 112 on each sample 108 is determined based on inclusion of associated standard deviation values in one of first cluster 188 or second cluster 190. Thus, according to FIG. 10, samples 3, 4, 5, and 6 are determined to have an anisotropic microstructure, and samples 1, 2, 7, and 8 are determined to have an isotropic microstructure.

An exemplary technical effect of the systems and methods described herein includes at least one of: (a) non-destructive inspection and determination of coating microstructures; (b) providing an inspection technique with non-ionizing radiation; and (c) providing an inspection technique that is capable of on-wing deployment.

Exemplary embodiments of systems and methods for use in non-destructive examination of coatings deposited on substrates are not limited to the specific embodiments described herein, but rather, components of systems and/or steps of the methods may be utilized independently and separately from other components and/or steps described herein. For example, the methods and systems may also be used in combination with other non-metallic coating systems, and are not limited to practice with only thermal barrier coatings or environmental barrier coatings as described herein. Rather, the exemplary embodiment can be implemented and utilized in connection with many other applications, equipment, and systems that may benefit from the technical effects recited herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in inspecting a coating on a substrate, the system comprising:
   a platform configured to receive a sample including the substrate having the coating deposited thereon;
   a light source configured to direct a plurality of electromagnetic pulses towards a scanning location on the coating, wherein the light source is oriented to direct the plurality of electromagnetic pulses at an oblique angle relative to a surface of the coating;
   a light detector configured to receive electromagnetic pulses reflected from the sample, wherein a first portion of each electromagnetic pulse is reflected from the surface of the coating at an interface between the coating and an ambient environment, and wherein a second portion of each electromagnetic pulse is reflected from a surface of the substrate at an interface between the coating and the substrate; and
   an actuator coupled to at least one of the platform and the light source, wherein the actuator is configured to move the platform and the light source relative to each other such that the plurality of electromagnetic pulses are directable towards the scanning location from different rotational positions; and
   a computing device in communication with the light detector, the computing device configured to:
   determine a time delay between reception of the first portion and the second portion of each reflected electromagnetic pulse at the light detector, thereby defining a plurality of time delays; and
   analyze the plurality of time delays to assess a microstructure of the coating by determining a standard deviation value for each of the plurality of time delays associated with each sample, grouping the plurality of standard deviation values based on relative differences in the plurality of standard deviation values, and assessing the microstructure of the coating of each sample based on the grouping.

2. The system in accordance with claim 1, wherein the actuator is coupled to the platform, and is configured to rotate the platform relative to the light source.

3. The system in accordance with claim 1, wherein the actuator is coupled to the light source, and is configured to rotate the light source about the platform.

4. A method of inspecting a coating on a substrate, the method comprising:
   directing a plurality of electromagnetic pulses towards a scanning location on the coating, each electromagnetic pulse directed from a different rotational position relative to the scanning location, and each electromagnetic pulse directed at an oblique angle relative to a surface of the coating, wherein a first portion of each electromagnetic pulse is reflected from the surface of the coating, and wherein a second portion of each electromagnetic pulse is reflected from a surface of the substrate at an interface between the coating and the substrate;
   determining a time delay between reception of the first portion and the second portion of each reflected electromagnetic pulse at a light detector, thereby defining a plurality of time delays; and
   analyzing the plurality of time delays to assess a microstructure of the coating,
   wherein analyzing the plurality of time delays to assess a microstructure of the coating comprises:
   determining a standard deviation value for each of the plurality of time delays associated with each sample;
   grouping the plurality of standard deviation values based on relative differences in the plurality of standard deviation values;
   and assessing the microstructure of the coating of each sample based on the grouping.

5. The method in accordance with claim 4, wherein analyzing the time delays comprises determining a standard deviation of the time delay for each of the plurality of electromagnetic pulses.

6. The method in accordance with claim 5 further comprising comparing the standard deviation to a predetermined threshold, wherein a first microstructure is determined when the standard deviation is greater than the predetermined threshold, and wherein a second microstructure is determined when the standard deviation is less than the predetermined threshold.

7. The method in accordance with claim 4, wherein directing a plurality of electromagnetic pulses comprises directing the plurality of electromagnetic pulses having a wavelength in the terahertz frequency range.

8. The method in accordance with claim 4, wherein directing a plurality of electromagnetic pulses comprises:
   emitting the plurality of electromagnetic pulses from a light source; and
   rotating at least one of the substrate and the light source.

9. The method in accordance with claim 8, wherein rotating at least one of the substrate or the light source comprises positioning the light source within a rotational range defined between about 0 degrees and about 360 degrees relative to the scanning location.

10. The method in accordance with claim 4 further comprising:
    providing a visual cue on the coating at the scanning location; and
    directing the plurality of electromagnetic pulses towards the visual cue from each rotational position.

11. A method of assessing a coating microstructure, the method comprising:
    providing a plurality of samples each having a substrate and a coating deposited thereon;
    evaluating each sample with a plurality of electromagnetic pulses that are each directed from a different rotational position relative to each the respective sample;
    obtaining time delay data associated with the plurality of electromagnetic pulses being reflected from the plurality of samples, wherein a time delay is defined by receiving a first portion and a second portion of each electromagnetic pulse reflected from each sample at different points in time; and assessing a microstructure of the coating on the plurality of samples based on a comparison of the time delay data associated with the plurality of samples, wherein assessing the microstructure of the coating on the plurality of samples based on a comparison of the time delay data associated with the plurality of samples comprises:

determining a standard deviation of the time delay data associated with each sample;

grouping the standard deviation values based on relative differences in the standard deviation values; and assessing the microstructure of the coating of each sample based on the grouping.

12. The method in accordance with claim 11, wherein grouping the standard deviation values comprises defining a first cluster and a second cluster, the first cluster and the second cluster being separated by a value that is greater than a maximum difference in standard deviation values contained in either the first cluster or the second cluster.

13. The method in accordance with claim 12, the method further comprising wherein assessing the microstructure comprises:

determining the microstructure is anisotropic when the standard deviation of a sample is included in the first cluster; and determining the microstructure is isotropic when the standard deviation of a sample is included in the second cluster.

14. The method in accordance with claim 11, wherein evaluating each sample comprises directing the plurality of electromagnetic pulses towards a scanning location on the coating, each electromagnetic pulse directed at an oblique angle relative to a surface of the coating, wherein the first portion of each electromagnetic pulse is reflected from the surface of the coating, and wherein the second portion of each electromagnetic pulse is reflected from a surface of the substrate.

15. The method in accordance with claim 14, wherein directing a plurality of electromagnetic pulses comprises directing the plurality of electromagnetic pulses having a wavelength in the terahertz frequency range.

16. The method in accordance with claim 14, wherein directing a plurality of electromagnetic pulses comprises:

emitting the plurality of electromagnetic pulses from a light source; and rotating at least one of the substrate and the light source.

17. The method in accordance with claim 16, wherein rotating at least one of the substrate or the light source comprises positioning the light source within a rotational range defined between about 0 degrees and about 360 degrees relative to the scanning location.

18. The method in accordance with claim 11 further comprising:

providing a visual cue on the coating at a scanning location; and directing the plurality of electromagnetic pulses towards the visual cue from each rotational position.

* * * * *